United States Patent
Sugaya

(10) Patent No.: US 11,210,335 B2
(45) Date of Patent: Dec. 28, 2021

(54) SYSTEM AND METHOD FOR JUDGING SITUATION OF OBJECT

(71) Applicant: OPTIM CORPORATION, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 0 days.

(21) Appl. No.: 17/280,450

(22) PCT Filed: Sep. 27, 2018

(86) PCT No.: PCT/JP2018/036000
§ 371 (c)(1),
(2) Date: Mar. 26, 2021

(87) PCT Pub. No.: WO2020/065839
PCT Pub. Date: Apr. 2, 2020

(65) Prior Publication Data
US 2021/0311986 A1    Oct. 7, 2021

(51) Int. Cl.
*G06F 16/583* (2019.01)
*G06T 7/55* (2017.01)
*G06T 7/73* (2017.01)
*G06F 16/53* (2019.01)
(Continued)

(52) U.S. Cl.
CPC ......... *G06F 16/5854* (2019.01); *G06F 16/53* (2019.01); *G06K 9/4609* (2013.01); *G06K 9/6202* (2013.01); *G06T 7/55* (2017.01); *G06T 7/73* (2017.01)

(58) Field of Classification Search
None
See application file for complete search history.

(56) References Cited

U.S. PATENT DOCUMENTS

2017/0278386 A1*  9/2017  Ko ............... G06F 16/5838
2019/0303686 A1* 10/2019  Guo .............. G06K 9/3241

FOREIGN PATENT DOCUMENTS

| JP | 2005-100122 A | 4/2005 |
| JP | 2007-41762 A  | 2/2007 |
| JP | 2007-209008 A | 8/2007 |

(Continued)

OTHER PUBLICATIONS

International Search Report issued in PCT/JP2018/036000, dated Nov. 13, 2019.

*Primary Examiner* — Bernard Krasnic
(74) *Attorney, Agent, or Firm* — Norton Rose Fulbright US LLP; James R. Crawford

(57) ABSTRACT

A system for judging a situation of an object includes a component analysis unit that extracts a feature point in an image and analyzes at least two components selected from an object contained in the image, a posture, a shape, an orientation, and an expression of the object, a type and a location of a part of the object, and a background in the image; a situation acquisition unit that acquires situation data indicating the situation of the object from an image search computer; a learning unit that associates and learns a combination of the components with the acquired situation data; and an object situation judgement unit that judges the situation of the object based on the learning result of the situation data when a result of analysis for a predetermined image is same as or similar to the combination of the components.

9 Claims, 8 Drawing Sheets

(51) Int. Cl.
*G06K 9/46* (2006.01)
*G06K 9/62* (2006.01)

(56) References Cited

FOREIGN PATENT DOCUMENTS

| | | |
|---|---|---|
| JP | 2010-92199 A | 4/2010 |
| JP | 2012-22419 A | 2/2012 |
| JP | 6216024 B1 | 10/2017 |

* cited by examiner

System for judging situation of object

<Judgement result>

The uploaded image looks like "Lover". } 801

How is the judgement result?

In addition,
"Parent and children", "Beach", "Couple" are the candidates. } 802

Please provide feedback. } 803

○ Satisfied (Appropriate judgement)

◎ Dissatisfied (Inappropriate judgement) — 804

The right result is: [____]
805

Send feedback

Menu (806)  End (807)

SYSTEM AND METHOD FOR JUDGING SITUATION OF OBJECT

CROSS REFERENCE TO RELATED APPLICATIONS

This patent application is a national phase under 35 U.S.C. § 371 of International Patent Application No. PCT/JP2018/036000 filed Sep. 27, 2018, which is hereby incorporated herein by reference in its entirety for all purposes.

TECHNICAL FIELD

The present disclosure relates a system and a method for judging the situation of an object, and a program.

BACKGROUND

A method for providing a monitoring device that monitors two or more moving objects or crowds such as moving persons and vehicles by detecting the head candidate area in a whole image is proposed (Patent Document 1).

As the technique of machine learning by which artificial intelligence analyzes an image, supervised learning is known well. A method for generating a learned model depending on a purpose is also proposed (Patent Document 2).

DOCUMENT IN THE EXISTING ART

Patent Document

Patent Document 1: JP2007-209008A
Patent Document 2: JP6216024B

SUMMARY

However, the technique of Patent Document 1 can macroscopically monitor two or more moving objects or crowds but cannot specifically judge what situation objects in an image are in. The technique of Patent Document 2 needs to prepare a large number of images, add correct teacher data to the images before having a classifier classifying the images, a neural network, etc. to generate a leaned model when supervised learning is performed for image analysis. It takes a time to prepare images for learning.

For these problems, the inventor has focused on making the connection between components analyzed by extracting the feature point of an object in an image and situation data of the object, acquiring an image related to the situation data from an image search the acquired image and the situation data as teacher data to save time preparing images and judge the situation of an object in the image with a high degree of accuracy.

An objective of the present disclosure is to provide a system and a method for judging the situation of an object, and a program that can make the connection between the components of an object in an image and the situation data of the object and automatically learn the connection to judge the situation of the object in the image based on the learning result.

The first aspect of the present disclosure provides a system for judging the situation of an object, including:

a component analysis unit that extracts a feature point in an image and analyzes at least two components selected from an object contained in the image, the posture, the shape, the orientation, and the expression of the object, the type and the location of a part of the object, and the background in the image;

a situation acquisition unit that acquires situation data indicating the situation of the object from an image search computer that acquires a character and searches for an image related to the character;

a learning unit that associates and learns the combination of the components with the acquired situation data; and an object situation judgement unit that judges the situation of the object based on the learning result of the situation data when the result of the analysis for a predetermined image that has been performed by the component analysis unit is same as or similar to the combination of the components.

According to the first aspect of the present disclosure, the system for judging the situation of an object includes:

a component analysis unit that extracts a feature point in an image and analyzes at least two components selected from an object contained in the image, the posture, the shape, the orientation, and the expression of the object, the type and the location of a part of the object, and the background in the image;

a situation acquisition unit that acquires situation data indicating the situation of the object from an image search computer that acquires a character and searches for an image related to the character;

a learning unit that associates and learns the combination of the components with the acquired situation data; and an object situation judgement unit that judges the situation of the object based on the learning result of the situation data when the result of the analysis for a predetermined image that has been performed by the component analysis unit is same as or similar to the combination of the components.

The first aspect of the present disclosure is the category of a system for judging the situation of an object, but the categories of a method for judging the situation of an object and a program have similar functions and effects.

The second aspect of the present disclosure provides the system for judging the situation of an object according to the first aspect of the present disclosure, in which when a plurality of objects are contained in the image, the component analysis unit analyzes each of the plurality of objects and extracts a feature point in the image and then analyzes at least two of the posture, the shape, the orientation, the expression of the analyzed object, the type and the location of a part of the object, and the background in the image, and the object situation judgement unit judges what the plurality of objects are doing as a whole.

According to the second aspect of the present disclosure, in the system for judging the situation of an object according to the first aspect of the present disclosure, when a plurality of objects are contained in the image, the component analysis unit analyzes each of the plurality of objects and extracts a feature point in the image and then analyzes at least two of the posture, the shape, the orientation, the expression of the analyzed object, the type and the location of a part of the object, and the background in the image, and the object situation judgement unit judges what the plurality of objects are doing as a whole.

The third aspect of the present disclosure provides the system for judging the situation of an object according to the first or the second aspect of the present disclosure, in which when a plurality of objects are contained in the image, the component analysis unit extracts and analyzes at least one of the combination of the objects, the relative positions between the objects, and the relative position of a part of the objects as the components.

According to the third aspect of the present disclosure, in the system for judging the situation of an object according to the first or the second aspect of the present disclosure, when a plurality of objects are contained in the image, the component analysis unit extracts and analyzes at least one of the combination of the objects, the relative positions between the objects, and the relative position of a part of the objects as the components.

The fourth aspect of the present disclosure provides the system for judging the situation of an object according to any one of the first to the third aspects of the present disclosure, in which the situation acquisition unit acquires the character by search using the image.

According to the fourth aspect of the present disclosure, in the system for judging the situation of an object according to any one of the first to the third aspects of the present disclosure, the situation acquisition unit acquires the character by search using the image.

The fifth aspect of the present disclosure provides a method for judging the situation of an object that is performed by a system for judging the situation of an object, including the steps of:

extracting a feature point in an image and analyzing at least two components selected from an object contained in the image, the posture, the shape, the orientation, and the expression of the object, the type and the location of a part of the object, and the background in the image;

acquiring situation data indicating the situation of the object from an image search computer that acquires a character and searches for an image related to the character;

associating and learning the combination of the components with the acquired situation data; and judging the situation of the object based on the learning result of the situation data when the result of the analysis for a predetermined image that has been performed by the component analysis unit is same as or similar to the combination of the components.

The sixth aspect of the present disclosure provides a computer readable program for causing a system for judging the situation of an object to execute the steps of:

extracting a feature point in an image and analyzing at least two components selected from an object contained in the image, the posture, the shape, the orientation, and the expression of the object, the type and the location of a part of the object, and the background in the image;

acquiring situation data indicating the situation of the object from an image search computer that acquires a character and searches for an image related to the character;

associating and learning the combination of the components with the acquired situation data; and judging the situation of the object based on the learning result of the situation data when the result of the analysis for a predetermined image that has been performed by the component analysis unit is same as or similar to the combination of the components.

The present disclosure can provide a system and a method for judging the situation of an object, and a program that can make the connection between the components of an object in an image and the situation data of the object and automatically learn the connection to judge the situation of the object in the image based on the learning result.

BRIEF DESCRIPTION OF THE DRAWINGS

FIG. 8 shows an example of the screen output from a system for judging the situation of an object.

DETAILED DESCRIPTION

Embodiments of the present disclosure will be described below with reference to the attached drawings. However, this is illustrative only, and the technological scope of the present disclosure is not limited thereto.

Overview of System for Judging the Situation of an Object

Figure 1:
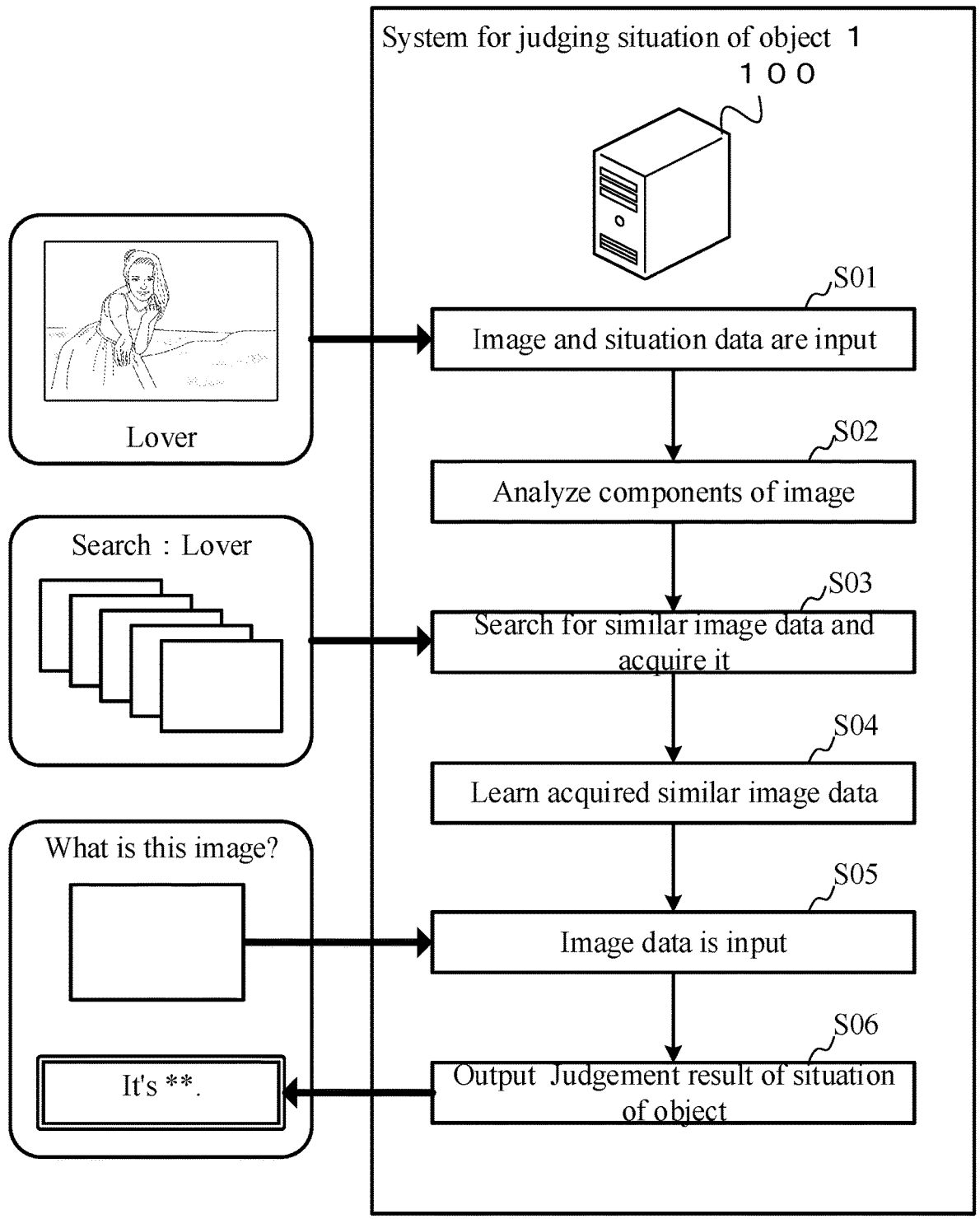
FIG. 1 is a schematic diagram of a preferable embodiment of the present disclosure.

FIG. 1 is a schematic diagram of a preferable embodiment of the present disclosure. The overview of the present disclosure is described below with reference to FIG. 1. The system for judging the situation of an object 1 includes a computer 100. FIG. 1 shows one computer 100, but the number of computers may be two or more. The computer 100 is not be limited to an actual device and may be a virtual device.

Figure 2:
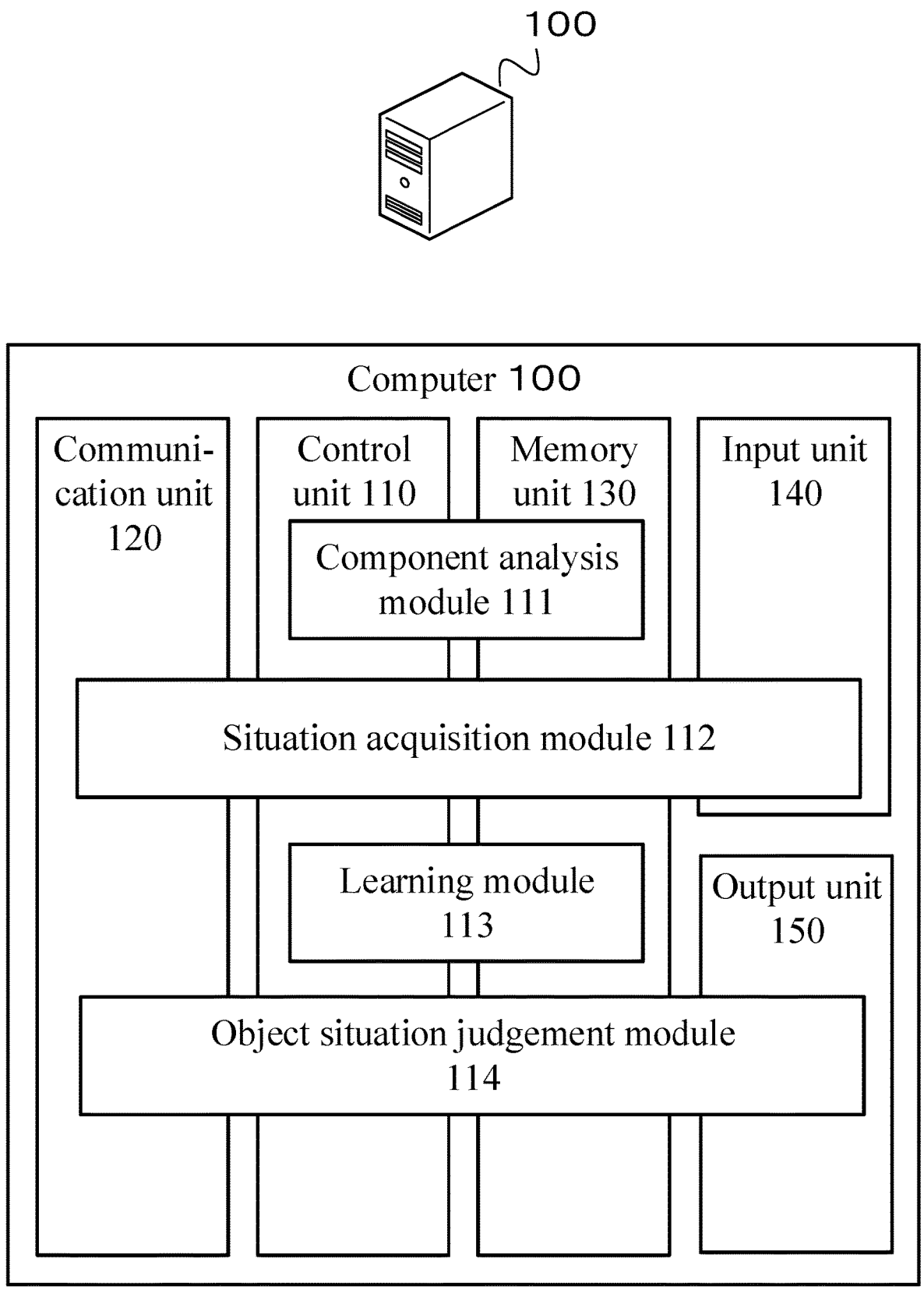
FIG. 2 is a functional block diagram of the computer 100 to show the relationship among the functions.

The computer 100 includes a control unit 110, a communication unit 120, a memory unit 130, an input unit 140, and an output unit 150 as shown in FIG. 2. The control unit 110 achieves a component analysis module 111 and a learning module 113 in cooperation with the memory unit 130. The control unit 110 also achieves a situation acquisition module 112 in cooperation with the communication unit 120, the memory unit 130, and an input unit 140. The control unit 110 also achieves an object situation judgement module 114 in cooperation with the communication unit 120, the memory unit 130, and the output unit 150. The communication part 120 enables the computer 100 to communicate with a user terminal (not shown) of the system for judging a situation 1 through a communication network.

The computer 100 is a computer device that is capable of the operation of the system for judging the situation of an object 1. The attached drawings show a desktop computer as an example of the computer 200. Examples of the computer 200 include electrical appliances such as a mobile phone, a mobile information terminal, a tablet terminal, a personal computer, a net book terminal, a slate terminal, an electronic book terminal, and a portable music player, and wearable terminals such as smart glasses and a head mounted display. The computer 100 is not be limited to an actual device and may be a virtual device.

In the system for judging the situation of an object 1 shown in FIG. 1, the computer 100 receives an input of an image and situation data for learning (Step S01). For the learning to judge the situation of an object, teacher data combining an image containing an object and situation data indicating what situation the object is in is needed. The situation data herein literally indicates the situation of the object. In this example, the image 601 shown in FIG. 6 and the situation data "Lover" are input. The input may be come from the input unit 140 of the computer 100 or other computers and terminals through the communication unit 120.

The component analysis module 111 of the computer 100 analyzes the components of the input image (Step S02). The component analysis module 111 extracts a feature point in the image and detects the object contained in the image as a method of analyzing the components. The component analysis module 111 analyzes the posture, the shape, the orientation, the expression of the detected object, and the type and the position of a part of the object in detail. The component analysis module 111 also analyzes the background in the image based on the feature point in the image in the same way. If a plurality of objects are contained in the image, the component analysis module 111 analyzes each of the objects and judges what the objects are doing as a whole. Moreover, if a plurality of objects are contained in the image, the component analysis module 111 analyzes the combination of the objects, the relative positions between the objects, and the relative position of a part of the objects together with the components. The component analysis module 111 associates and stores the analysis result of the components with the situation data in the memory unit 130.

Figure 6:
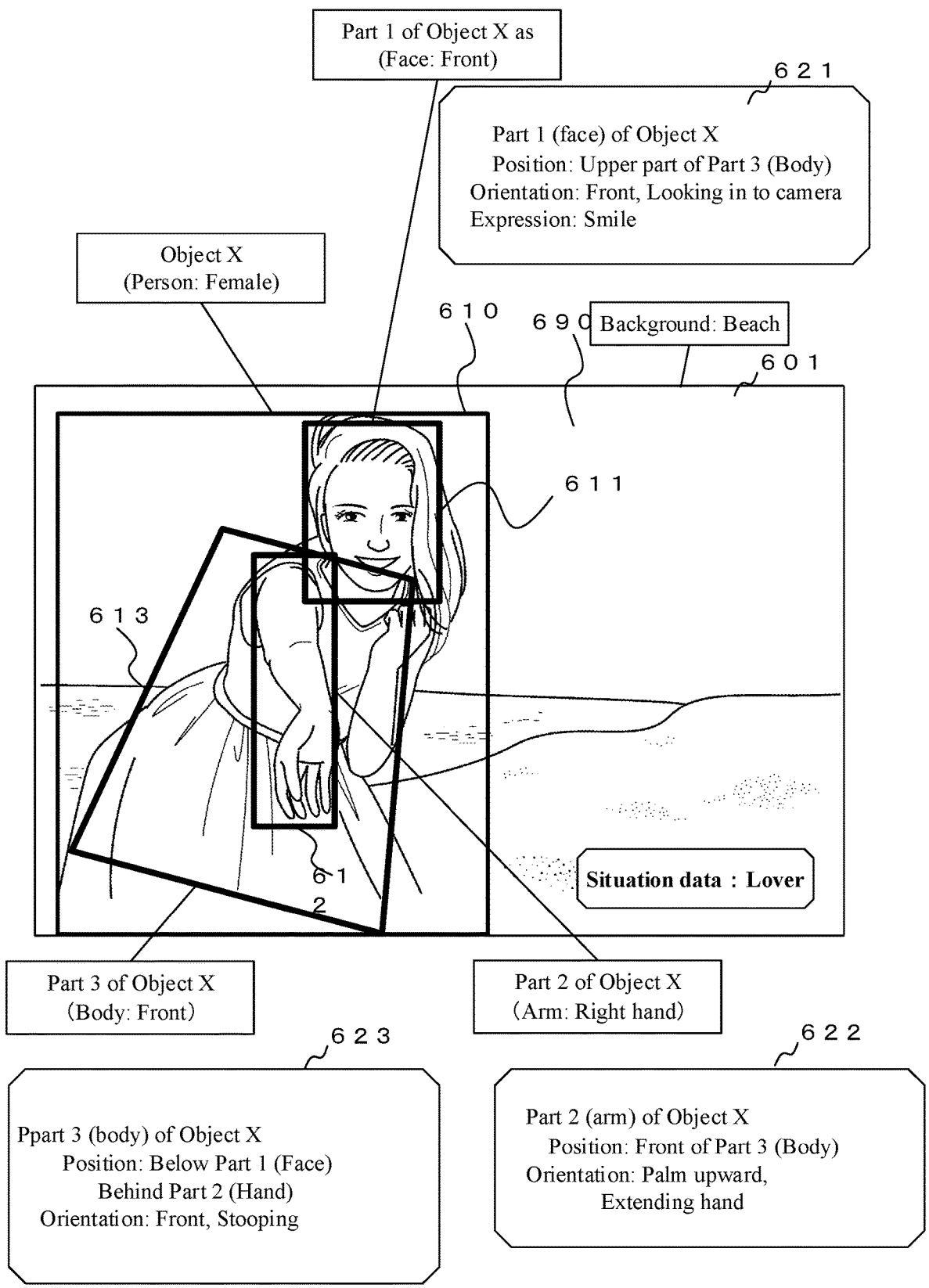
FIG. 6 shows an example of the component analysis process performed for an image.

FIG. 6 shows an example of the component analysis process performed for an image. The example illustrates how the component analysis module 111 analyzes the components when the image 601 and the situation data "Lover" are input. The component analysis module 111 extracts a feature point in the image 601 and detects the object 610 as the object X. The component analysis module 111 detects the object X as "(Person: Female)" based on the feature. The component analysis module 111 also analyzes the part 1(Part 611 in FIG. 6), the part 2 (Part 612 in FIG. 6), and the part 3 (Part 613 in FIG. 6) as parts of the object X. The component analysis module 111 detects the part 1 of the object X as "(Face: Front)," the part 2 of the object X as "(Arm: Right hand)," and the part 3 of the object X as "(Body: Front)" based on the features. The component analysis module 111 further analyzes the posture, the shape, the orientation, the expression of the detected object, and the type and the position of a part of the object in detail. The example shown in FIG. 6 illustrates "Position: Upper part of Part 3 (Body), Orientation: Front, Looking in to camera, Expression: Smile," as the analysis result 621 of the part 1 (face) of the object X, "Position: Front of Part 3 (Body), Orientation: Palm upward, Extending hand," as the analysis result 622 of the part 2 (arm) of the object X, and "Position: Below Part 1 (Face), Behind Part 2 (Hand), Orientation: Front, Stooping" as the analysis result 623 of the part 3 (body) of the object X. The component analysis module 111 detects the background 690 as "Beach."

Returning to FIG. 1, the situation acquisition module 112 of the computer 100 acquires the character of the situation data and searches for similar image data related to the character (Step S03). In this example, the situation acquisition module 112 searches for the character of the situation data "Lover" by an image search computer such as an external search engine and acquires two or more images of the search result of "Lover." The use of an external image search computer, etc., makes it possible to acquire a number of images that match with the situation data without taking time.

The learning module 113 of the computer 100 learns the association of the two or more acquired images with the character of the searched situation data as the teacher data (Step S04). In the example shown in FIG. 1, the learning module 113 learns what situation the combination of the components of each of the images is in when the situation data is "Lover." The component analysis of the acquired images uses the component analysis module 111 in the same way as the step S02. The learning module 113 associates and stores the analysis result of the components with the situation data in the memory unit 130.

The steps S01 to S04 are repeated. The system for judging the situation of an object 1 can judge the situation of an object in the image after learning about enough situation data. The system for judging the situation of an object 1 is assumed to learn about sufficient situation data at this point.

After the learning is ended, the computer 100 receives an input of the image data for which the user of the system for judging the situation of an object 1 wants to judge the situation from the user (Step S05). The input may be come from the input unit 140 of the computer 100 or other computers and terminals used by the user through the communication unit 120.

The object situation judgement module 114 of the computer 100 judges the situation of the object of the image data input in the step S05 and outputs it (Step S06). To judge the situation of the object, the object situation judgement module 114 analyzes the components of the image input by using the component analysis module 111 and judges if the combination of the components and the analysis result are same as or similar to the learning result of the situation data from the step S04. If the combination of the components and the analysis result are same as or similar to the learning result of the situation data, the object situation judgement module 114 outputs the situation data of the learning result as the situation of the object. For the similarity judgement, the object situation judgement module 114 may judge if the similarity falls into within a certain threshold.

As described above, the present disclosure can provide a system and a method for judging the situation of an object, and a program that make the connection between a component analyzed by extracting the feature point of an object in an image and situation data of the object, acquire an image related to the situation data from an image search computer, and automatically learn the combination of the components in the image with the acquired image and the situation data as teacher data to save time preparing images and judge the situation of an object in the image with a high degree of accuracy.

Functions

FIG. 2 is a functional block diagram of the computer 100 to show the relationship among the functions. The computer 100 includes a control unit 110, a communication unit 120, a memory unit 130, an input unit 140, and an output unit 150. The control unit 110 achieves a component analysis module 111 and a learning module 113 in cooperation with the memory unit 130. The control unit 110 also achieves a situation acquisition module 112 in cooperation with the communication unit 120, the memory unit 130, and an input unit 140. The control unit 110 also achieves an object situation judgement module 114 in cooperation with the communication unit 120, the memory unit 130, and the output unit 150. The communication part 120 enables the computer 100 to communicate with a user terminal (not shown) of the system for judging a situation 1 through a communication network.

The computer 100 is a computer device that is capable of the operation of the system for judging the situation of an object 1. The attached drawings show a desktop computer as an example of the computer 200. Examples of the computer 200 include electrical appliances such as a mobile phone, a mobile information terminal, a tablet terminal, a personal computer, a net book terminal, a slate terminal, an electronic book terminal, and a portable music player, and wearable terminals such as smart glasses and a head mounted display. The computer 100 is not be limited to an actual device and may be a virtual device.

The control unit 110 includes a central processing unit (hereinafter referred to as "CPU"), a random access memory (hereinafter referred to as "RAM"), and a read only memory (hereinafter referred to as "ROM"). The control unit 110 achieves a component analysis module 111 and a learning module 113 in cooperation with the memory unit 130. The control unit 110 also achieves a situation acquisition module 112 in cooperation with the communication unit 120, the memory unit 130, and an input unit 140. The control unit 110 also achieves an object situation judgement module 114 in cooperation with the communication unit 120, the memory unit 130, and the output unit 150.

The communication unit 120 includes a device that is communicative to other devices, such as a Wireless Fidelity (Wi-Fi®) enabled device complying with, for example, IEEE 802.11, or a wireless device complying with the IMT-2000 standard such as the third and the fourth generation mobile communication systems. The communication unit may include a wired device for LAN connection. The communication part 120 communicates with a user terminal (not shown) of the system for judging a situation 1 through a communication network as needed.

The memory unit 130 includes a data storage unit such as a hard disk or a semiconductor memory, which stores images, image data, situation data, and data necessary for component analysis results, etc. The memory unit 130 may store the association of the learned analysis result of the components in the image with the situation data as a database.

The input unit 140 has a function necessary to operate the system for judging the situation of an object 1. As an example to achieve the input, the input unit 140 may include a liquid crystal display with a touch panel function, a keyboard, a mouse, a pen tablet, a hardware button on the device, and a microphone to perform voice recognition. The features of the present disclosure are not limited in particular by the input method.

The output unit 150 has a function necessary to operate the system for judging the situation of an object 1. As an example to achieve the output, the output unit 130 may take forms such as a liquid crystal display, a PC display, and a projector to display images and output voices. The features of the present disclosure are not limited in particular by the output method.

First Object Situation Judging Process

Figure 3:
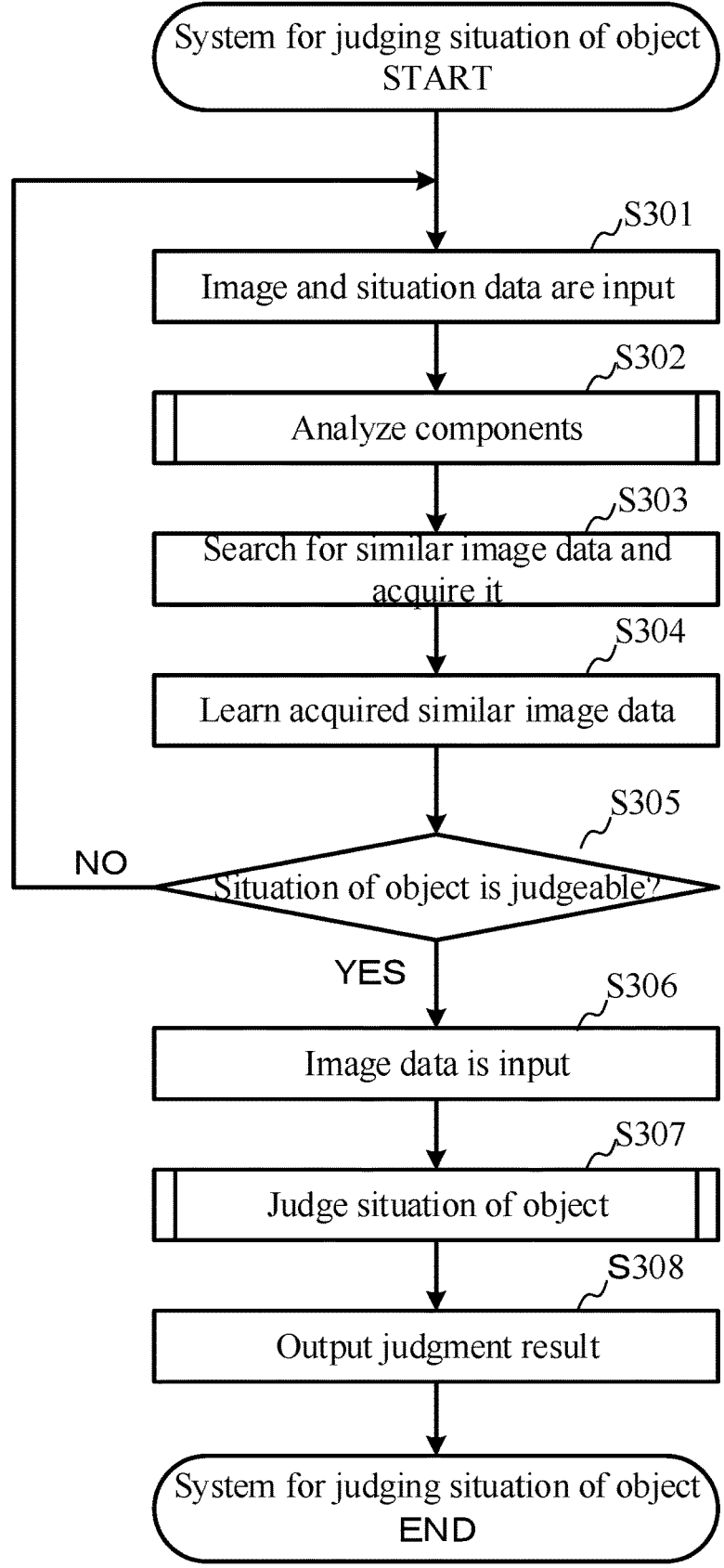
FIG. 3 is a flow chart of the object situation judgement process.

FIG. 3 is a flow chart of the object situation judgement process. The tasks executed by the modules will be described below with this process.

The computer 100 receives an input of an image and situation data for learning (Step S301). For the learning to judge the situation of an object, teacher data combining an image containing an object and situation data indicating what situation the object is in is needed. The situation data herein literally indicates the situation of the object. In this example, the image 601 shown in FIG. 6 and the situation data "Lover" are input. The input may be come from the input unit 140 of the computer 100 or other computers and terminals through the communication unit 120.

The component analysis module 111 of the computer 100 analyzes the components of the input image (Step S302). The component analysis module 111 extracts a feature point in the image and detects the object contained in the image as a method of analyzing the components. The component analysis module 111 analyzes the posture, the shape, the orientation, the expression of the detected object, and the type and the position of a part of the object in detail. The component analysis module 111 also analyzes the background in the image based on the feature point in the image in the same way. If a plurality of objects are contained in the image, the component analysis module 111 analyzes each of the objects and judges what the objects are doing as a whole. Moreover, if a plurality of objects are contained in the image, the component analysis module 111 analyzes the combination of the objects, the relative positions between the objects, and the relative position of a part of the objects together with the components. The learning module 113 associates and stores the analysis result of the components with the situation data in the memory unit 130. Details of the component analysis process are described later.

FIG. 6 shows an example of the component analysis process performed for an image. The example illustrates how the component analysis module 111 analyzes the components when the image 601 and the situation data "Lover" are input. The component analysis module 111 extracts a feature point in the image 601 and detects the object 610 as the object X. The component analysis module 111 detects the object X as "(Person: Female)" based on the feature. The component analysis module 111 also analyzes the part 1(Part 611 in FIG. 6), the part 2 (Part 612 in FIG. 6), and the part 3 (Part 613 in FIG. 6) as parts of the object X. The component analysis module 111 detects the part 1 of the object X as "(Face: Front)," the part 2 of the object X as "(Arm: Right hand)," and the part 3 of the object X as "(Body: Front)" based on the features. The component analysis module 111 further analyzes the posture, the shape, the orientation, the expression of the detected object, and the type and the position of a part of the object in detail. The example shown in FIG. 6 illustrates "Position: Upper part of Part 3 (Body), Orientation: Front, Looking in to camera, Expression: Smile," as the analysis result 621 of the part 1 (face) of the object X, "Position: Front of Part 3 (Body), Orientation: Palm upward, Extending hand," as the analysis result 622 of the part 2 (arm) of the object X, and "Position: Below Part 1 (Face), Behind Part 2 (Hand), Orientation: Front, Stooping" as the analysis result 623 of the part 3 (body) of the object X. The component analysis module 111 detects the background 690 as "Beach."

The situation acquisition module 112 of the computer 100 acquires the character of the situation data and searches for similar image data related to the character (Step S303). In this example, the situation acquisition module 112 searches for the character of the situation data "Lover" by an image search computer such as an external search engine and acquires two or more images of the search result of "Lover." The use of an external image search computer, etc., makes it possible to acquire a number of images that match with the situation data without taking time.

The learning module 113 of the computer 100 learns the association of the two or more acquired images with the character of the searched situation data as the teacher data (Step S304). In the example, the learning module 113 learns what situation the combination of the components of each of the images is in when the situation data is "Lover." The component analysis of the acquired images uses the component analysis module 111 in the same way as the step S302. The learning module 113 associates and stores the analysis result of the components with the situation data in the memory unit 130.

The computer 100 checks if the object situation judgement module 114 can judge the situation of the object (Step S305). At this stage, the steps S301 to S304 are repeated many times. If sufficient situation data has been learned, the object situation judgement module 114 can judge the situation of an object. If sufficient situation data has been learned, and the object situation judgement module 114 can judge the situation of an object, the process proceeds to the step S306. If sufficient situation data has not been learned, the process returns to the step S301.

If the learning is ended, the computer 100 receives an input of the image data for which the user of the system for judging the situation of an object 1 wants to judge the situation from the user (Step S306). The input may be come from the input unit 140 of the computer 100 or other computers and terminals used by the user through the communication unit 120.

The object situation judgement module 114 of the computer 100 judges the situation of the object of the image data input in the step S306 (Step S307). To judge the situation of the object, the object situation judgement module 114 analyzes the components of the image input by using the component analysis module 111 and judges if the combination of the components and the analysis result are same as or similar to the learning result of the situation data from the step S304. If the combination of the components and the analysis result are same as or similar to the learning result of the situation data, the object situation judgement module 114 outputs the situation data of the learning result as the situation of the object. For the similarity judgement, the object situation judgement module 114 may judge if the similarity falls into within a certain threshold. Details of the object situation judgement process are described later.

The object situation judgement module 114 of the computer 100 outputs the judgment result from the step S307 and outputs it (Step S308). The output may go to the output unit 150 of the computer 100 or the output units of other computers and terminals used by the users through the communication unit 120.

In this example, an input of both of the image and the situation data is received in the step S301 for the learning. However, an input of only the image may be received in the step S301. In this case, the situation acquisition module 112 can acquire a suitable character string for the image by the search using the input image to acquire the character of the situation data. For the search using the image, an external image search computer may be used.

As described above, the present disclosure can provide a system and a method for judging the situation of an object, and a program that make the connection between a component analyzed by extracting the feature point of an object in an image and situation data of the object, acquire an image related to the situation data from an image search computer, and automatically learn the combination of the components in the image with the acquired image and the situation data as teacher data to save time preparing images and judge the situation of an object in the image with a high degree of accuracy.

Component Analysis process

Figure 4:
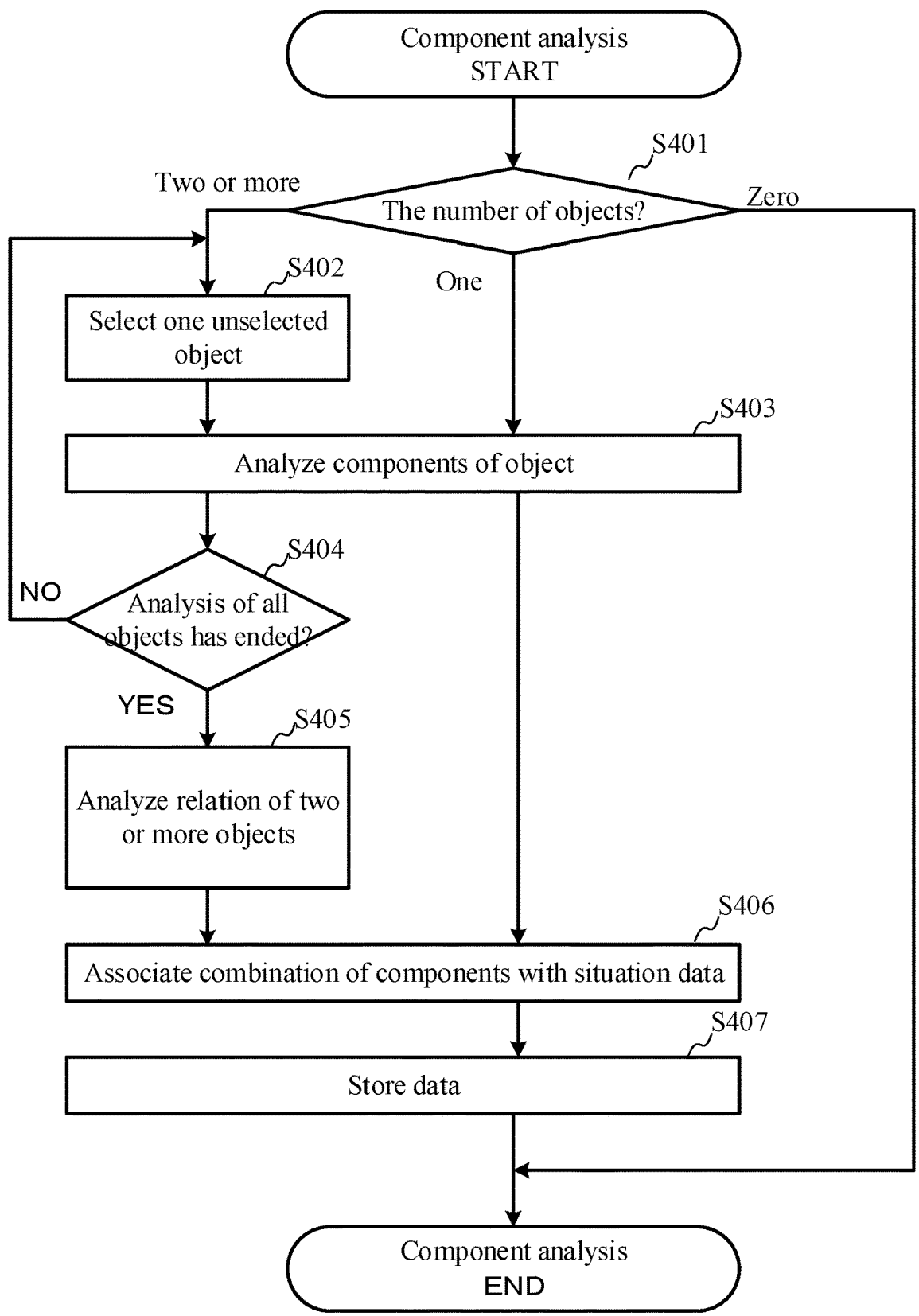
FIG. 4 is a flow chart of the component analysis process.

FIG. 4 is a flow chart of the component analysis process. This process corresponds to the process of the step S302 shown in FIG. 3.

In the component analysis process, the component analysis module 111 checks the number of the objects in the image (Step S401). If the number of the objects in the image is two or more, the process proceeds to the step S402. If the number of the objects is one, the process proceeds to the step S403. If the number of the objects is zero, the process ends.

An example where the number of the objects is one is described below. If the number of the objects is one, the component analysis module 111 analyzes the components of the object (Step S403).

FIG. 6 shows an example of the component analysis process performed for an image when the number of objects is one. The example illustrates how the component analysis module 111 analyzes the components when the image 601 and the situation data "Lover" are input. The component analysis module 111 extracts a feature point in the image 601 and detects the object 610 as the object X. The component analysis module 111 detects the object X as "(Person: Female)" based on the feature. The component analysis module 111 also analyzes the part 1(Part 611 in FIG. 6), the part 2 (Part 612 in FIG. 6), and the part 3 (Part 613 in FIG. 6) as parts of the object X. The component analysis module 111 detects the part 1 of the object X as "(Face: Front)," the part 2 of the object X as "(Arm: Right hand)," and the part 3 of the object X as "(Body: Front)" based on the features. The component analysis module 111 further analyzes the posture, the shape, the orientation, the expression of the detected object, and the type and the position of a part of the object in detail. The example shown in FIG. 6 illustrates "Position: Upper part of Part 3 (Body), Orientation: Front, Looking in to camera, Expression: Smile," as the analysis result 621 of the part 1 (face) of the object X, "Position: Front of Part 3 (Body), Orientation: Palm upward, Extending hand," as the analysis result 622 of the part 2 (arm) of the object X, and "Position: Below Part 1 (Face), Behind Part 2 (Hand), Orientation: Front, Stooping" as the analysis result 623 of the part 3 (body) of the object X. The component analysis module 111 detects the background 690 as "Beach."

Returning to FIG. 4, the component analysis module 111 associates the combination of the components analyzed in the step S403 with the situation data (Step S406). Specifically in the example shown in FIG. 6, the component analysis module 111 associates the combination of the part 1 of the object X "(Face: Front) Position: Upper part of Part 3 (Body), Orientation: Front, Looking in to camera, Expression: Smile," the part 2 of the object X "(Arm: right hand) Position: Front of Part 3 (Body), Orientation: Palm upward, Extending hand," and the part 3 of the object X "(Body; Front) Position: Below Part 1 (Face), Behind Part 2 (Hand), Orientation: Front, Stooping" with the situation data "Lover." At this point, all of the components may be associated with the situation data. Alternatively, some important components may be associated with the situation data.

The component analysis module 111 stores the data associated in the step S406 in the memory unit 130 (Step S407).

An example where the number of the objects is two or more is described below.

Figure 7:
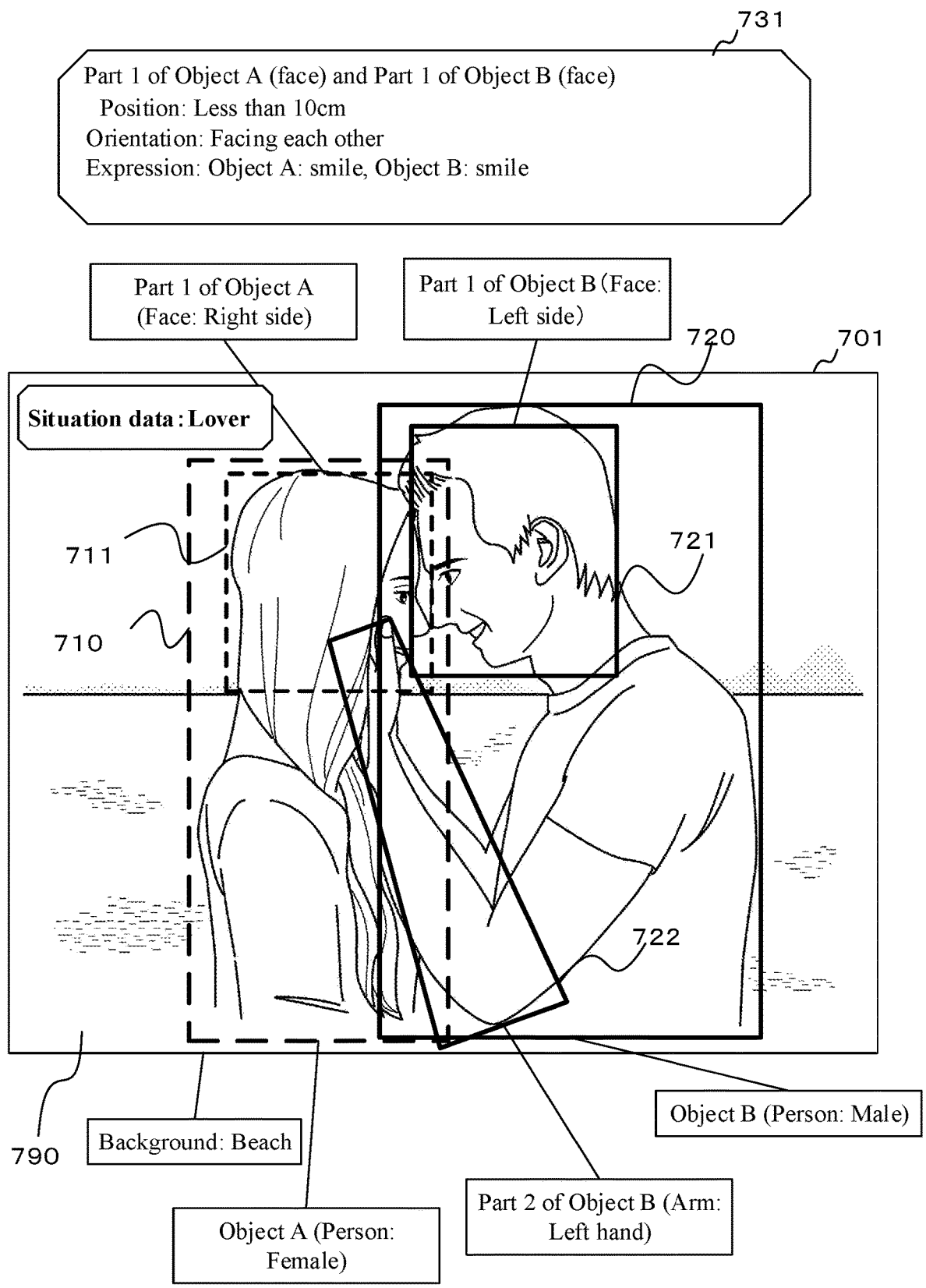
FIG. 7 shows an example of the component analysis process performed for an image when the number of objects is two or more.

FIG. 7 shows an example of the component analysis process performed for an image when the number of objects is two or more. The example illustrates how the component analysis module 111 analyzes the components when the image 701 and the situation data "Lover" are input. In Step S501, the component analysis module 111 extracts a feature point in the image 701 and detects the object 710 as the object A. The component analysis module 111 also detects the object 720 as the object B. Therefore, the number of the objects in the image 701 is two.

Returning to FIG. 4, if the number of the objects is two or more, the component analysis module 111 selects one unselected object (Step S402). In FIG. 7, the object A is selected.

The component analysis module 111 analyzes the components of the selected object A (Step S403). The component analysis module 111 detects the object A in FIG. 7 as "(Person: Female)" based on the feature. The component analysis module 111 detects the part 1 (Part 711 in FIG. 7) as a part of the object A. The component analysis module 111 analyzes the posture, the shape, the orientation, the expression of the detected object, and the type and the position of a part of the object in detail and detects the part 1 of the object A as "(Face: Right side)". The component analysis module 111 may also analyze the background 790. The component analysis module 111 detects the background 790 as "Beach."

Returning to FIG. 4, the component analysis module 111 checks if the analysis of all the objects has ended (Step S404). At this point, the process returns to the step S402 and selects the object B because the analysis of all the objects has not ended.

The component analysis module 111 analyzes the components of the selected object B (Step S403). The component analysis module 111 detects the object B in FIG. 7 as "(Person: Male)" based on the feature. The component analysis module 111 detects the part 1 (Part 721 in FIG. 7) and the part 2 (Part 722 in FIG. 7) as parts of the object B. The component analysis module 111 analyzes the posture, the shape, the orientation, the expression of the detected object, and the type and the position of a part of the object in detail and detects the part 1 of the object B as "(Face: Left side)", and the part 2 of the object B as "(Arm: left had)."

Returning to FIG. 4, the component analysis module 111 checks if the analysis of all the objects has ended (Step S404). At this point, the process proceeds to the step S405 because the analysis of all the objects has ended.

The component analysis module 111 analyzes the relation of two or three or more objects in the image 701 (Step S405). Specifically, examples of the components include the combination of objects, the relative position between the objects, and the relative position of parts of the objects. The example image 701 in FIG. 7 shows that the part 1 of the object A (face) and the part 1 of the object B (face) are detected as "Position: less than 10 cm, Orientation: Facing each other, Expression: Object A: smile, Object B: smile" as the analysis result 731.

Returning to FIG. 4, the component analysis module 111 associates the combination of the components analyzed in the step S403 with the relation of the components analyzed in the step S405 and the situation data (Step S406). Specifically, in the example shown in FIG. 7, the component analysis module 111 associates the object A "(Person: Female)," the part 1 of the object A "(Face: Right side)," the object B "(Person: Male)," the part 1 of the object B "(Face: Left side)," the part 2 of the object B "(Arm: Left hand)," the part 1 of the object A and the part 1 of the object B "Position: Less than 10 cm, Orientation: Facing each other, Expression: Object A: Smile, Object B: Smile", and "Background: Beach" with the situation data "Lover." At this point, all of the components may be associated with the situation data. Alternatively, some important components may be associated with the situation data.

The component analysis module 111 stores the data associated in the step S406 in the memory unit 130 (Step S407).

As described above, the component analysis process can be appropriately analyzed even if the number of the objects is one or two or more.

Object Situation Judgement Process

Figure 5:
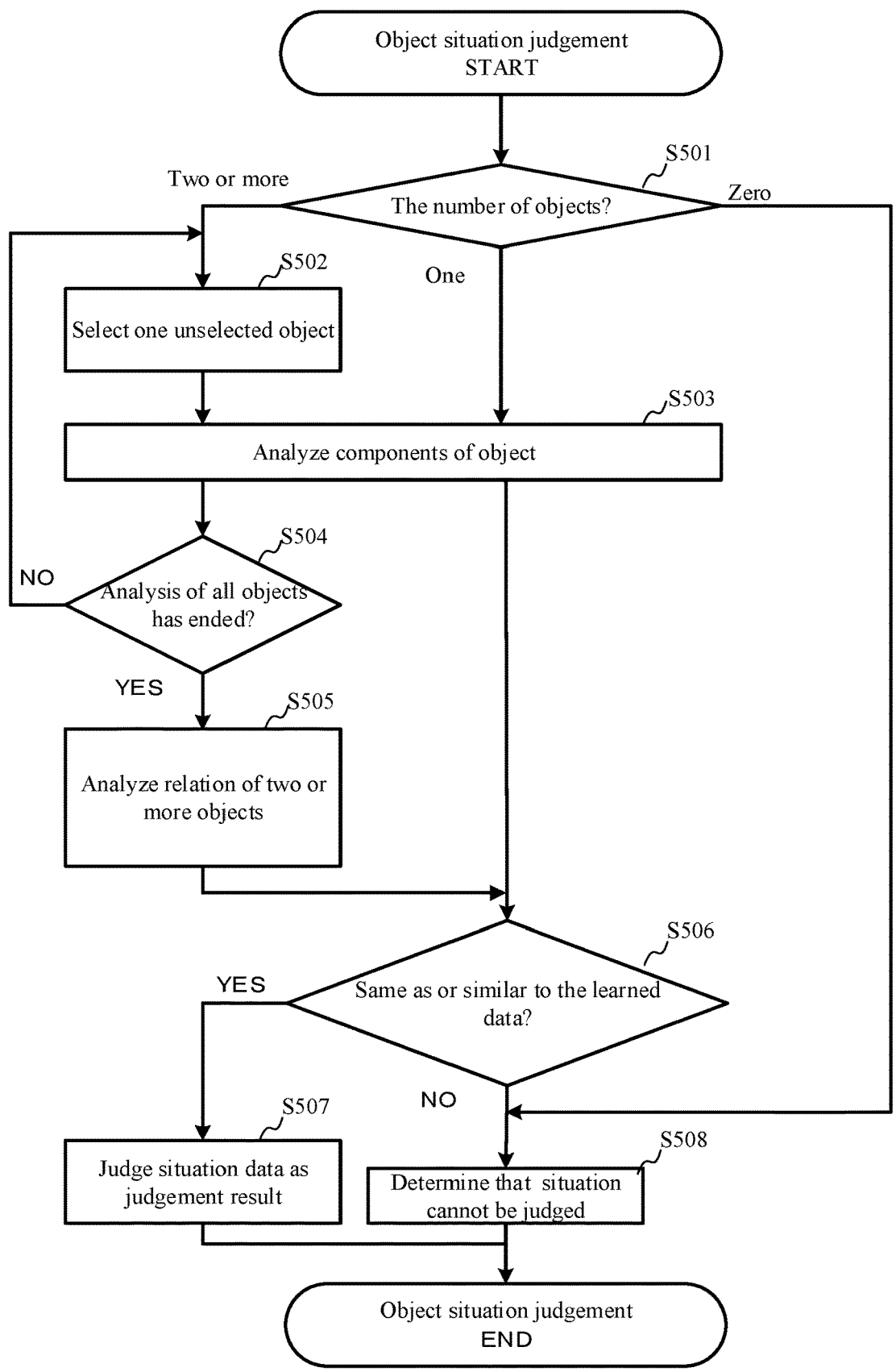
FIG. 5 is a flow chart of the object situation judgement process.

FIG. 5 is a flow chart of the object situation judgement process. This process corresponds to the process of the step S307 shown in FIG. 3.

The steps S505 to S501 of the object situation judgement process correspond to the steps S401 to S405 of the component analysis process. The object situation judgement module 114 may use the steps of the component analysis module 111. Details of the steps are as described above and thus omitted.

The object situation judgement module 114 checks if the analysis result from the steps S503 to S505 is same as or similar to the learned data stored in the memory unit 130 (Step S506). If the analysis result is same as or similar to the learned data, the process proceeds to the step S507. If the analysis result is not same as or similar to the learned data, the process proceeds to the step S508.

If the analysis result is same as or similar to the learned data stored in the memory unit 130, the object situation judgement module 114 judges the situation data same as or similar to the learned data as the judgement result of the input image (Step S507).

If the analysis result is same as or similar to the learned data stored in the memory unit 130, the object situation judgement module 114 determines that the situation of the object in the input image cannot be judged (Step S508).

As described above, the situation data that is appropriate for the input image data can be judged as the situation of the object.

Object Situation Judgement Result Output Process

FIG. 8 shows an example of the screen output from a system for judging the situation of an object. In the step S308 shown in FIG. 3, the output unit 150 of the computer 100 or the output unit of the terminal used by the user may display such a screen 810. The button 806 is to return to the menu screen of the system for judging the situation of an object 1. The button 807 is to end the system for judging the situation of an object 1. As the display 801, the situation judgement result of the input image is literally displayed as the judgement result. In the example shown in FIG. 8, the judgement result is "Lover." As the display 802, other candidates of the judgement result are displayed. The flow chart shown in FIG. 5 illustrates the case where the number of the judgement results is only one. If the number of judgement results is two or more, for example, if the number of the similar learned data is two or more, the two or more judgement results may be displayed. As the display 803, an example where feedback is received from the user is displayed. The result is learned as teacher data on the response to feedback from the user whether or not the judgement is appropriate to enable the accuracy of the system for judging the situation of an object 1 to increase. The user can select "Satisfied (Appropriate judgement)" or "Dissatisfied (Inappropriate judgement)" with the radio buttons. If the user selects "Dissatisfied (Inappropriate judgement)," the process prompts the user to input the correct result in the text box 804 and transmit the feedback with the button 805. The system for judging the situation of an object 1 receives character data containing the character of the feedback as the situation data and performs the steps S301 to S304 together with the input image to allow the learning to be newly performed.

As described above, the present disclosure can provide a system and a method for judging situation of an object, and a program that can increase the accuracy of the judgment by receiving feedback from the user.

To achieve the means and the functions that are described above, a computer (including a CPU, an information processor, and various terminals) reads and executes a predetermined program. For example, the program may be provided from a computer through a network, specifically, through Software as a Service (SaaS) or may be provided in the form recorded in a computer-readable medium such as a flexible disk, CD (e.g., CD-ROM), DVD (e.g., DVD-ROM, DVD-RAM), or a compact memory. In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present disclosure are described above. However, the present disclosure is not limited to the above-mentioned embodiments. The effect described in the embodiments of the present disclosure is only the most preferable effect produced from the present disclosure. The effects of the present disclosure are not limited to those described in the embodiments of the present disclosure.

DESCRIPTION OF REFERENCE NUMERALS

1 System for judging the situation of an object
100 Computer

What is claimed is:

1. A system for judging a situation of an object comprising:
   a component analysis unit configured to extract a feature point in an image for learning and analyze at least two components selected from an object contained in the image, a posture, a shape, an orientation, and an expression of the object, a type and a location of a part of the object, and a background in the image;
   a situation acquisition unit configured to acquire a character of situation data indicating a situation of the object, and search for and acquire a plurality of images related to the character of situation data by an image search computer;
   a learning unit configured to analyze the components of the plurality of acquired images by the component analysis unit, and associate and learn a combination of the components of each of the images with the acquired character of situation data; and
   an object situation judgement unit configured to judge the situation of the object based on the learning result of the character of situation data when a result of analysis for a predetermined image that has been performed by the component analysis unit is same as or similar to the combination of the components.

2. The system according to claim 1, wherein when a plurality of objects are contained in the image, the component analysis unit is configured to analyze each of the plurality of objects and extract a feature point in the image and then analyze at least two of the posture, the shape, the orientation, the expression of the analyzed object, the type and the location of a part of the object, and the background in the image, and the object situation judgement unit is configured to judge what the plurality of objects are doing as a whole.

3. The system according to claim 1, wherein when a plurality of objects are contained in the image, the component analysis unit is configured to extract and analyze at least one of the combination of the objects and relative positions between the objects, and a relative position of a part of the objects as the components.

4. The system according to claim 1, further comprising an output unit configured to display a judgement result from judgement for a predetermined image and a field to prompt a user to input a correct result when the judgement result is inappropriate on an output part of a terminal, wherein a character input by the user is newly learned together with the predetermined image.

5. A method for judging a situation of an object that is performed by a system for judging the situation of the object, comprising steps of:
   extracting a feature point in an image for learning and analyzing at least two components selected from an object contained in the image, a posture, a shape, an orientation, and an expression of the object, a type and a location of a part of the object, and a background in the image;
   acquiring a character of situation data indicating a situation of the object, and searching for and acquiring a plurality of images related to the character of situation data by a computer for image search;
   analyzing the components of the plurality of acquired images by the step of analyzing, and associating and learning a combination of the components of each of the images with the acquired character of situation data; and
   judging the situation of the object based on the learning result of the character of situation data when a result of analysis for a predetermined image that has been performed by the extracting step is same as or similar to the combination of the components.

6. A non-transitory computer readable medium that stores a computer readable program for causing a system for judging a situation of an object to execute the steps of:
   extracting a feature point in an image for learning and analyzing at least two components selected from an object contained in the image, a posture, a shape, an orientation, and an expression of the object, a type and a location of a part of the object, and a background in the image;
   acquiring a character of situation data indicating a situation of the object, and searching for and acquiring a plurality of images related to the character of situation data by a computer for image search;
   analyzing the components of the plurality of acquired images by the step of analyzing, and associating and learning a combination of the components of each of the images with the acquired character of situation data; and
   judging the situation of the object based on the learning result of the character of situation data when a result of analysis for a predetermined image that has been performed by the extracting step is same as or similar to the combination of the components.

7. The system according to claim 2, wherein when a plurality of objects are contained in the image, the component analysis unit is configured to extract and analyze at least one of the combination of the objects and relative positions between the objects, and a relative position of a part of the objects as the components.

8. The system according to claim 2, further comprising an output unit configured to display a judgement result from judgement for a predetermined image and a field to prompt a user to input a correct result when the judgement result is inappropriate on an output part of a terminal, wherein a character input by the user is newly learned together with the predetermined image.

9. The system according to claim 3, further comprising an output unit configured to display a judgement result from judgement for a predetermined image and a field to prompt a user to input a correct result when the judgement result is inappropriate on an output part of a terminal, wherein a character input by the user is newly learned together with the predetermined image.

\* \* \* \* \*